E. THOMPSON.
Dumping Car.

No. 71,552. Patented Nov. 26, 1867.

Witnesses

Inventor
Edward Thompson

UNITED STATES PATENT OFFICE.

EDWARD THOMPSON, OF HOKAH, MINNESOTA.

DUMPING-CAR.

Specification forming part of Letters Patent No. 71,552, dated November 26, 1867.

*To all whom it may concern:*

Be it known that I, EDWARD THOMPSON, of Hokah, in the county of Houston and State of Minnesota, have invented certain new and useful Improvements in a Method of Unloading Cars; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in a new and improved method and device for unloading gravel, earth, and similar material from cars, as hereinafter explained.

Figure 1:
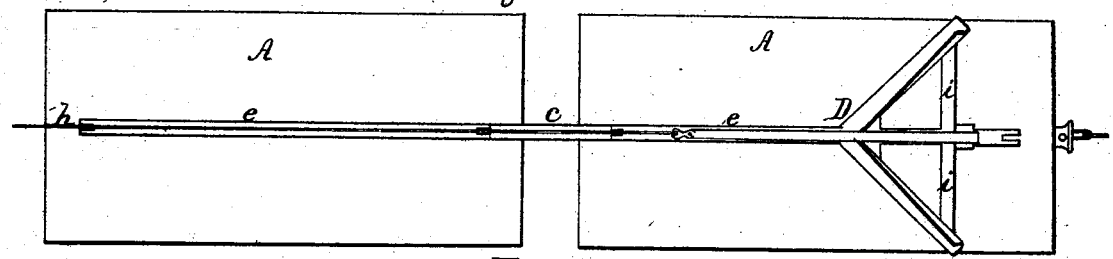
Figure 2:
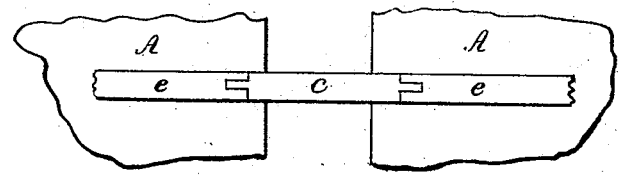
Figure 3:
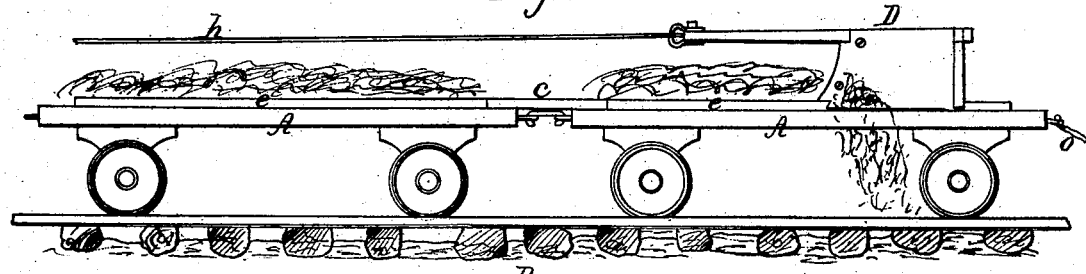

Figure 1 is a top-plan view; Fig. 3, a side elevation; and Figs. 2 and 4, views of portions shown more in detail.

In constructing railways it is frequently necessary to convey earth taken from excavations to other points for the purpose of filling hollows, and, in like manner, to convey gravel taken from banks or beds for the purpose of graveling the road-bed. It was formerly the custom to unload the cars by hand, and, more recently, to use cars specially built for the purpose, in such a manner that by means of trap or side doors, or by tipping the bodies, the material would be dumped where desired. The first process is slow, laborious, and expensive, while the latter requires cars to be built specially for the purpose, and is therefore expensive. My invention is intended to accomplish the desired object with ordinary platform-cars, and in a very simple and expeditious manner.

Figure 4:
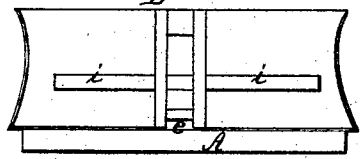

In the drawings, A represents the ordinary platform-cars, of which any required number may be used. Upon the platform of the cars, along their center, I secure a strip of wood or iron, as represented by $e$, to form a guide for the scraper D, which removes the material from the platform, as hereinafter explained. This guide is made continuous the entire length of the train by inserting pieces $c$, as shown in Fig. 2, in such a manner as to have its ends rest upon the platforms of the adjoining cars, it being so arranged as to prevent its becoming displaced either by the tongues and recesses, or in any other manner. I then construct a scraper, D, consisting of two wings standing obliquely at an angle of about forty-five degrees, united at their front, and extending outward on each side as far as the edge of the platform, as represented in Fig. 1. These wings are secured to a suitable frame to hold them rigidly in place; and at the center, in front where they unite, there is formed a notch or recess of proper form and size to receive the guide $e$, so that when the scraper is placed upon the platform the lower edges of the wings will rest upon the platform, while the guide $e$ serves to prevent it from being shoved to one or the other side, as shown in Figs. 3 and 4, the latter being a rear front view of the scraper resting on the platform. To the front of the scraper a line or chain, $h$, is attached, as shown, for the purpose of drawing it forward over the cars, and thereby remove the material therefrom, the wings shoving it off at each side like a double-mold-board plow.

The operation is as follows: The train, being loaded with gravel or other similar material, is drawn to the point where it is to be unloaded. The train is then secured permanently in position by means of a cable or chain, $o$, attached to one of the cars, and fastened to the track, as indicated in Fig. 3. The locomotive, being uncoupled from the train, has the scraper D attached to it by means of the cable $h$, and is then run slowly forward, drawing the scraper D after it over the platforms of the cars, and of course removing at one operation the load of the entire train; or, if preferred, the scraper may be placed at the front end of the train, and, when ready to unload, the cable $h$ may be hitched to a cross-tie, and the train then moved gently forward, by which means the detaching of the locomotive may be avoided.

By this method the engineer and brakeman, without assistance, can, in a very few moments, unload any number of cars that can be moved in a single train, thus saving greatly in labor, time, and expense. By this plan, also, the expense of building dumping-cars is entirely obviated, the ordinary platform-cars being best adapted to the purpose; and, when done, by simply removing the guide e, which can be done in a few minutes, the cars are at once made ready for the purposes to which such cars are ordinarily adapted.

Having thus described my invention, what I claim is—

1. The plan or method of unloading cars, substantially as described.

2. The use of a scraper, substantially such as described, when arranged to operate in connection with railway-cars, for the purpose of removing therefrom the gravel, earth, sand, or similar material with which they may be loaded, substantially as herein set forth.

EDWARD THOMPSON.

Witnesses:
W. C. DODGE,
H. B. MUNN.